United States Patent
Lee

(10) Patent No.: US 8,794,362 B2
(45) Date of Patent: Aug. 5, 2014

(54) ACTIVE AIR FLAP APPARATUS FOR VEHICLE

(75) Inventor: Seung Hyeob Lee, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 106 days.

(21) Appl. No.: 13/492,605

(22) Filed: Jun. 8, 2012

(65) Prior Publication Data
US 2013/0146375 A1      Jun. 13, 2013

(30) Foreign Application Priority Data

Dec. 8, 2011   (KR) .................. 10-2011-0130987

(51) Int. Cl.
*B60K 11/00*      (2006.01)
(52) U.S. Cl.
USPC ....................................... 180/68.1
(58) Field of Classification Search
USPC ............................... 180/68.1, 68.4
See application file for complete search history.

(56) References Cited

U.S. PATENT DOCUMENTS

| | | | | |
|---|---|---|---|---|
| 4,924,826 | A * | 5/1990 | Vinson ...................... | 123/195 C |
| 6,230,832 | B1 * | 5/2001 | von Mayenburg et al. .. | 180/68.1 |
| 6,854,544 | B2 * | 2/2005 | Vide ............................. | 180/68.6 |
| 2010/0243352 | A1 * | 9/2010 | Watanabe et al. ............ | 180/68.1 |
| 2012/0074729 | A1 * | 3/2012 | Fenchak et al. ............. | 296/193.1 |
| 2012/0097465 | A1 * | 4/2012 | Leffert et al. ................ | 180/68.1 |
| 2012/0132474 | A1 * | 5/2012 | Charnesky et al. .......... | 180/68.1 |

* cited by examiner

*Primary Examiner* — John Walters
*Assistant Examiner* — James Triggs
(74) *Attorney, Agent, or Firm* — Morgan, Lewis & Bockius LLP

(57) ABSTRACT

An active air flap apparatus for a vehicle in which upon the generation of a failure whereby an air flap is not able to be activated with power from an actuator, the connection between a guide frame and a flap loader is manually released, enabling the air flap to automatically be opened by wind produced by the vehicle.

4 Claims, 6 Drawing Sheets

ACTIVE AIR FLAP APPARATUS FOR VEHICLE

CROSS-REFERENCE TO RELATED APPLICATIONS

The present application claims priority of Korean Patent Application Number 10-2011-0130987 filed Dec. 8, 2011, the entire contents of which application is incorporated herein for all purposes by this reference.

BACKGROUND OF INVENTION

1. Field of Invention

The present invention relates, in general, to an active air flap apparatus for a vehicle and, more particularly, to an active air flap apparatus for a vehicle in which upon the generation of a failure, a connection structure between an actuator and an air flap is manually released, enabling the air flap to be automatically opened by wind supplied by the vehicle.

2. Description of Related Art

A variety of heat exchangers, such as a radiator, an intercooler, a vaporizer, a compressor, etc., as well as driving parts such as engine and the like, are generally present in an engine compartment.

Such heat exchangers contain an intermediate heat-exchange medium that moves therethrough to exchange heat with the external air so that the external air is cooled or heated. In order for activation of the heat exchanger installed in the engine compartment to be dependable, external air has to be smoothly supplied into the engine compartment.

However, upon high speed traveling of a vehicle or the like, a great amount of external air is quickly introduced, air resistance increases and thus the fuel efficiency drops.

To solve this problem, an active air flap apparatus has been developed in which upon traveling at low speeds, an angle of opening is made larger so as to increase the inflow of air into the engine compartment, and upon traveling at high speeds, the angle of opening is reduced so as to cut back on the inflow of air, thereby contributing to fuel efficiency improvements.

As shown in FIGS. 1 to 4, the conventional active air flap apparatus includes a duct 1 fixedly built to a front end module of a vehicle, an actuator 2 fixedly installed at the central portion of the duct 1, an H-type guide frame 4 connected with the actuator 2 via an actuator loader 3 so that it can vertically move with the power from the actuator 2, and an air flap 6 connected with the guide frame 4 via a flap loader 5 and also rotatably installed to the duct 1. Here, the actuator 2 includes a PCB 2a, a motor 2b, and a plurality of gear members 2c.

Thus, when the actuator 2 is activated under an external condition (engine temperature, cooling-water temperature, etc.), the power from the actuator 2 is transmitted to the guide frame 4 via the actuator loader 3, the guide frame 4 vertically moves as shown in the figures so that the flap loader 5 rotates, and finally the rotating force of the flap loader 5 is transmitted to the air flap 6 and thus rotates the air flap 6 so that the duct 1 is opened or closed.

In the active air flap apparatus, if the actuator 2 fails to operate owing to an electrical short-circuit or failure of the motor 2a or the like, it is impossible to operate the air flap 6 while a vehicle is in motion. In particular, if the operation of the air flap 6 is impossible under the situation where the air flap 6 blocks the duct 1, temperature of the engine and other heat exchangers increases, causing the vehicle to have serious problems.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art to provide an active air flap apparatus for a vehicle in which upon the generation of a failure, a connection structure between an actuator and an air flap is manually released, enabling the air flap to be automatically opened by wind produced by the vehicle, thereby preventing vehicle parts from being damaged.

Various aspects of the present invention provide for an active air flap apparatus for a vehicle, including a guide frame having a vertical column having a coupling hole, into which a flap loader is fitted, and a rod hole extending throughout the vertical column in such a manner as to be connected with the coupling hole, and an operating rod fitted into the rod hole in such a manner as to be moved along the rod hole, the operating rod having a coupling groove into which the flap loader is fitted.

The maximum depth of the coupling groove may be greater than the depth of the coupling hole.

The shape of the portion of the vertical column where the coupling hole is formed may be a linear shape of constant thickness.

The flap loader may be configured such that when the flap loader is fitted into the coupling groove, the flap loader is vertically moved together with the guide frame, and when the flap loader disengages from the coupling groove as the operating rod moves, the flap loader disengages from the coupling hole.

As previously set forth, according to the present invention, upon the generation of a failure whereby the air flap cannot be activated with power from the actuator, the connection between the guide frame and the flap loader is manually released, enabling the air flap to be automatically opened by wind produced by the vehicle, thereby preventing vehicle parts from being damaged due to the failure of the air flap.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
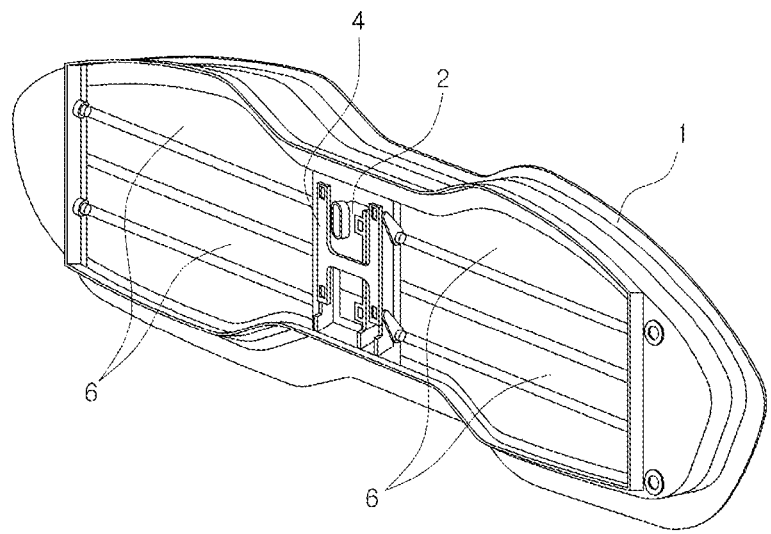
FIG. 1 is a view explaining a conventional active air flap apparatus.
Figure 2:
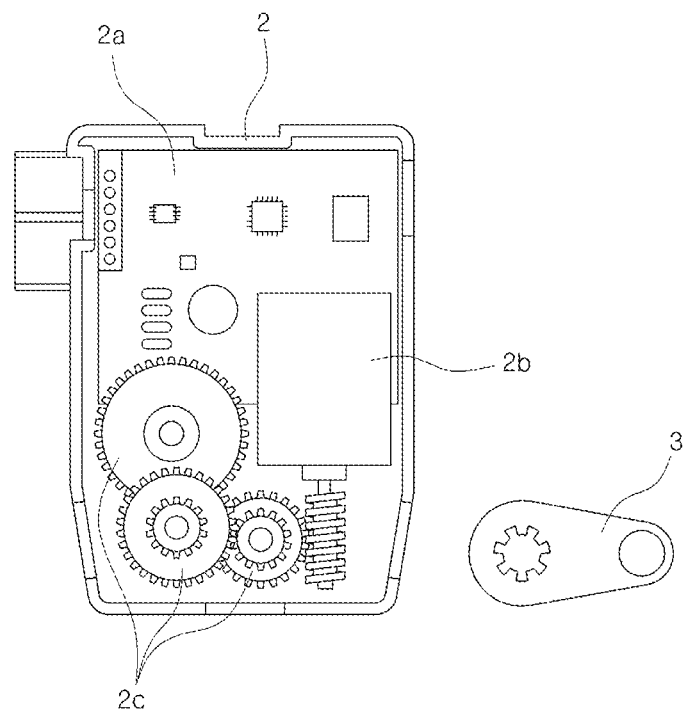
FIG. 2 is a view explaining an actuator of the active air flap apparatus of FIG. 1.
Figure 3:
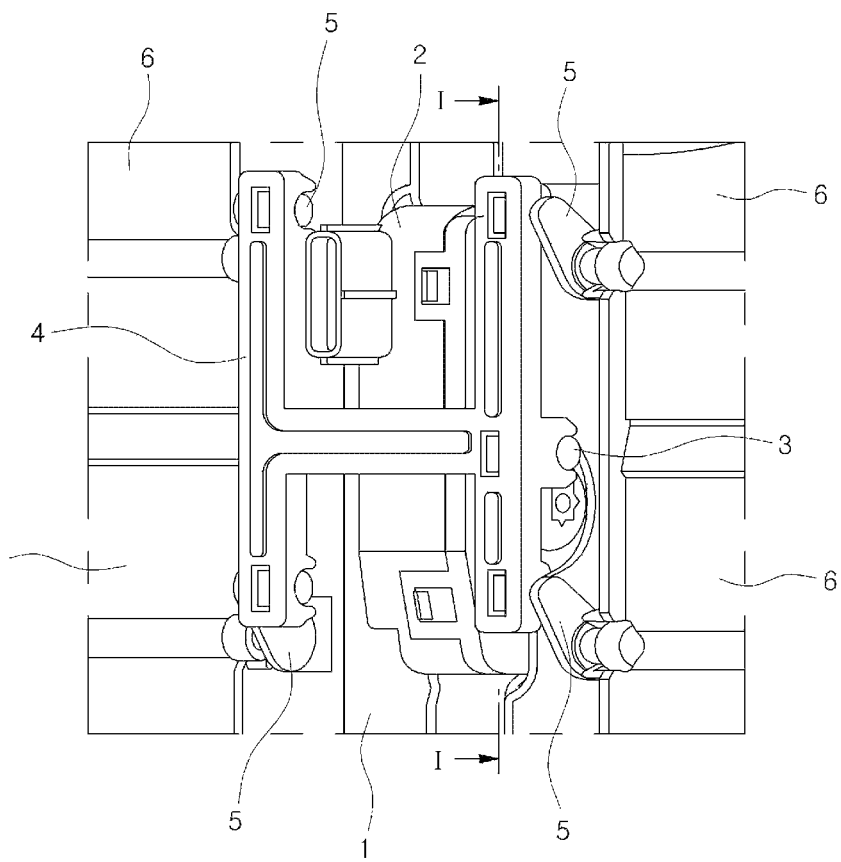
FIG. 3 is an enlarged view showing a coupled portion of the actuator of the active air flap apparatus of FIG. 1.
Figure 4:
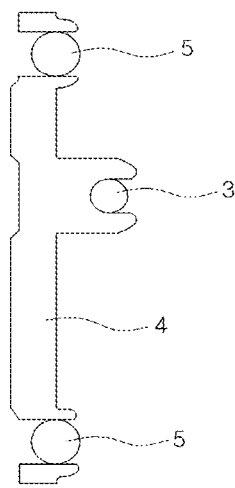
FIG. 4 is a cross-sectional view taken along line I-I of FIG. 3.
Figure 5:
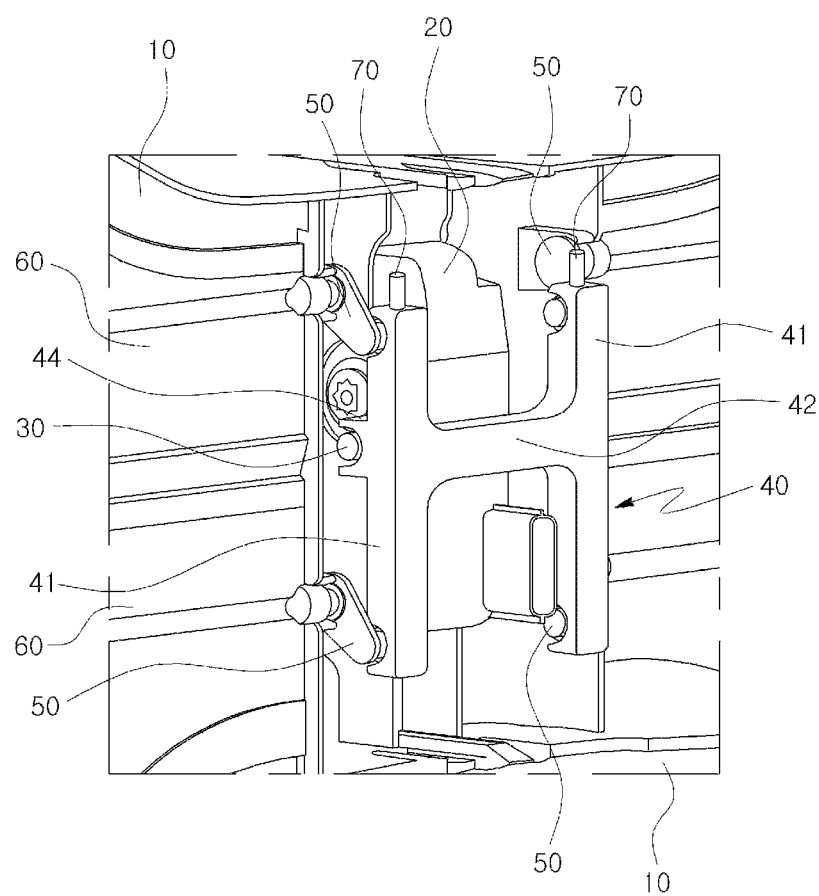
FIG. 5 is a view showing an exemplary active air flap apparatus according to the present invention in which an operating rod is coupled to a guide frame.
Figure 6:
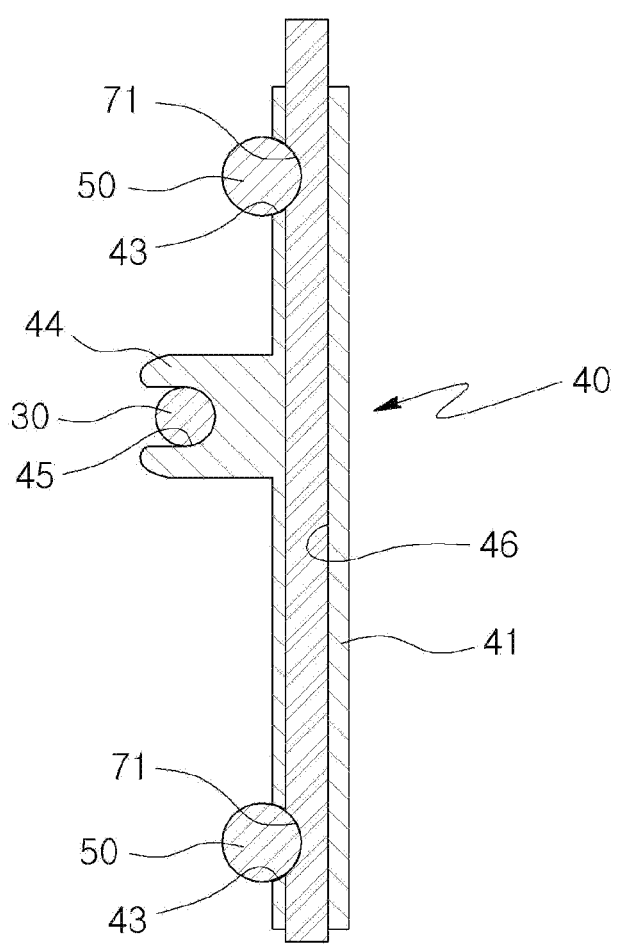
FIG. 6 is a cross-sectional view taken along line of FIG. 5.

As shown in FIGS. 5 and 6, an active air flap apparatus according to various embodiments includes a duct 10 fixedly built in a front end module of a vehicle, an actuator 20 fixedly installed at the central portion of the duct 10, an H-type guide frame 40 connected with the actuator 20 via an actuator loader 30 so that it can be vertically moved by the power from the actuator 20, and an air flap 60 connected with the guide frame 40 via a flap loader 50 and also rotatably installed to the duct 10.

Here, the guide frame 40 has an H-type structure which includes two parallel vertical columns 41 and a horizontal column 42 connecting the vertical columns 41. The vertical column 41 is provided in both upper and lower sides with a coupling hole 43 into which one end of the flap loader 50 is fitted. The vertical column 41 also has, on the intermediate portion, a protrusion 44 having a fitting groove 45 into which an end of the actuator loader 30 is fitted.

In addition, the vertical column 41 of the guide frame 40 is provided with a rod hole 46 that vertically transects the vertical column such that it is connected with the coupling hole 43.

The active air flap apparatus includes an operating rod 70 which is fitted into the rod hole 46 in such a manner as to move inside the rod hole 46. The operation rod 70 has a coupling groove 71 to which the flap loader 50 is fitted.

Here, when the flap loader 50 is in the state of being fitted into the coupling groove 71 of the operating rod 70, the flap loader 50 can vertically move with movement of the guide frame 40.

Figure 7:
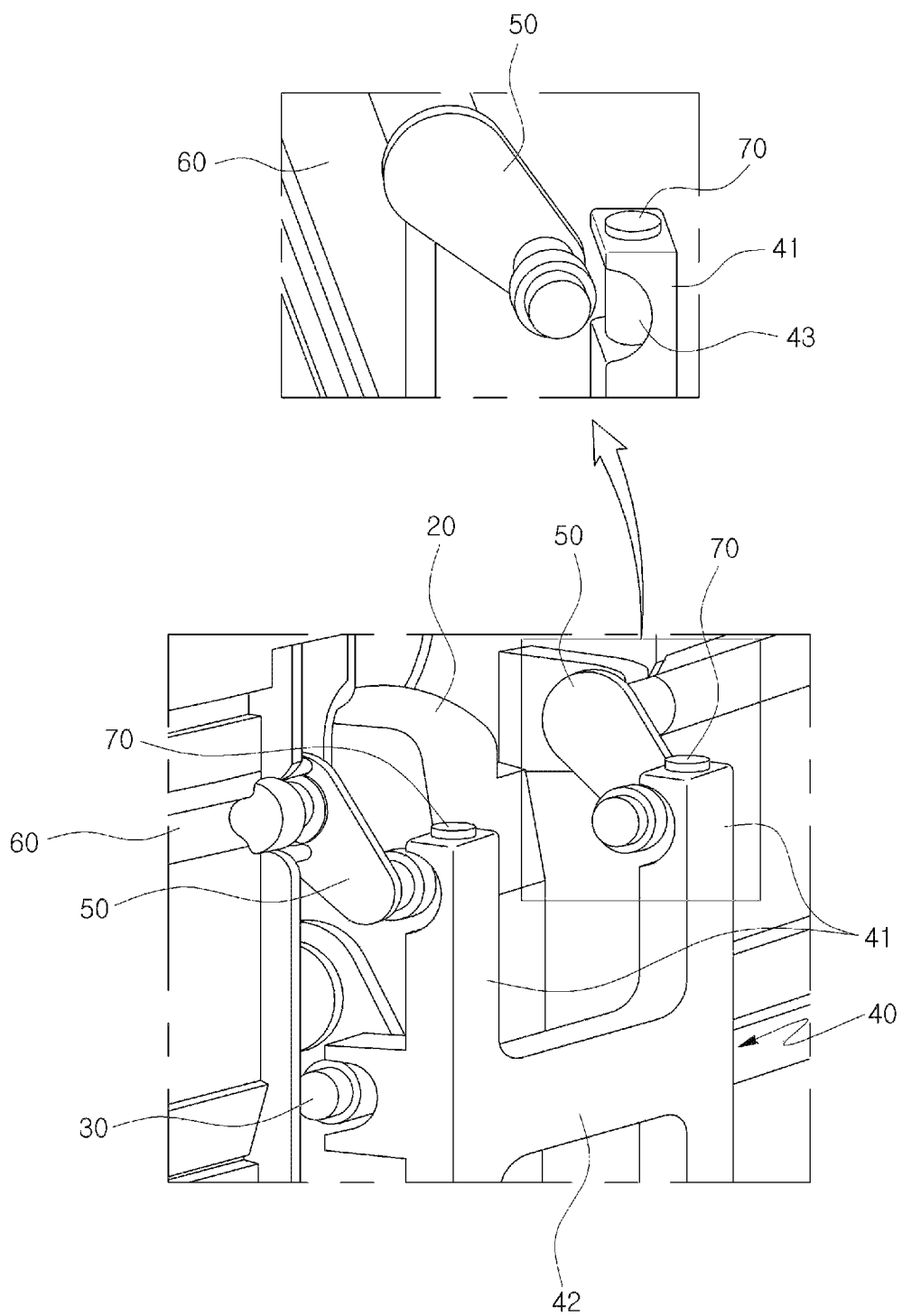
FIGS. 7 and 8 are views showing the state in which upon generation of a failure, an exemplary flap loader is disconnected from the guide frame by the operating rod.
Figure 8:
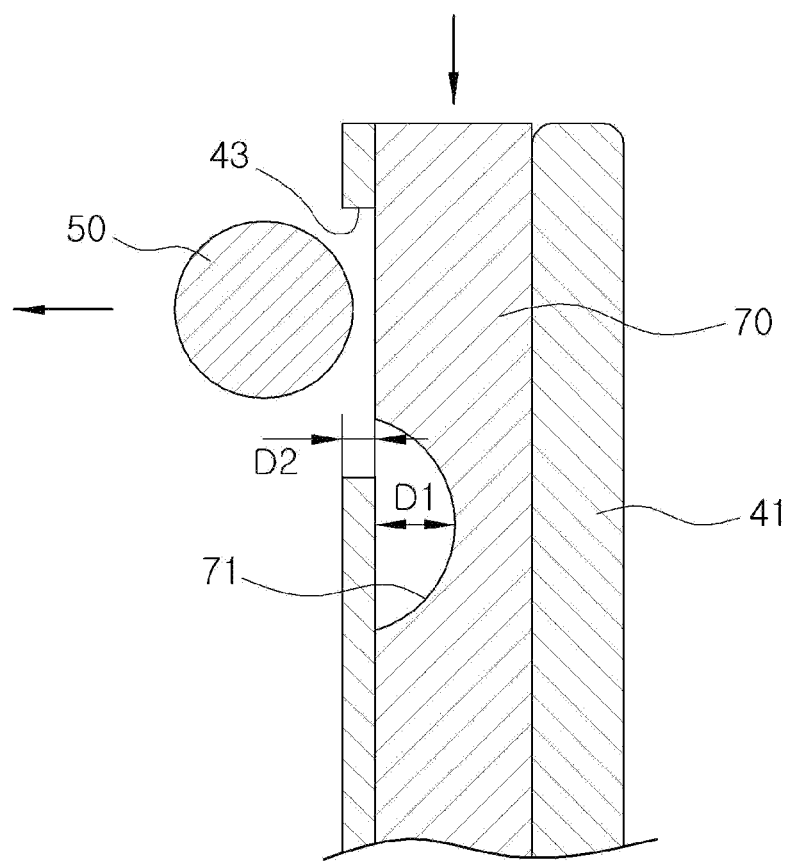

When the flap loader 50 disengages from the coupling groove 71 as the operating rod 70 moves inside the rod hole 46, the flap loader 50 becomes disengaged from the coupling hole 43 and thus disconnected from the guide frame 40 as shown in FIGS. 7 and 8.

In order to allow the flap loader 50 to disengage from the coupling hole 43 when it 50 disengages from the coupling groove 71, the maximum depth D1 of the coupling groove 71 is preferably greater than the depth D2 of the coupling hole 43, and the shape of the portion of the vertical column 41 of the guide frame 40 where the coupling hole 43 is formed is preferably be linear and of a constant thickness.

Now the operation of the active air flap will be described.

When the actuator 20 is activated under the normal condition of there being no electrical short-circuit or failure, the power from the actuator 20 is transmitted to the guide frame 40 via the actuator loader 30 so that the guide frame 30 can vertically move from the state shown in FIG. 5.

When the guide frame 40 vertically moves, one end of the flap loader 50, fitted into the coupling hole 43, also vertically moves together with the guide frame 40 so that the rotating force of the flap loader 50 is transmitted to and rotates the air flap 60, thereby opening or closing the duct 10.

In the case of a failure being generated due to an electrical short-circuit or the like, although the actuator 20 is activated, the power from the actuator 20 cannot be transmitted to the air flap 60, so that the air flap 60 cannot be opened or closed.

In particular, if while a vehicle travels, the operation of the air flap 60 is impossible under the situation where the air flap 60 blocks the duet 10, the temperature of the engine and other heat exchangers increases, possibly causing the vehicle to have serious problems.

Thus, to solve this problem, an operator should push down the operating rod 70 from the state shown in FIG. 6.

As the operating rod 70 moves down inside the rod hole 46 as shown in FIGS. 7 and 8, the flap loader 50 disengages from the coupling groove 71 of the operating rod 70 and thus finally from the coupling hole 43, resulting in the guide frame 40 and the flap loader 50 being disconnected.

When the guide frame 40 and the flap loader 50 are disconnected, the air flap 60 is ready to freely rotate under even a slight external force irrespective of the operation of the actuator 20. Thus, the air flap is freely rotated by wind caused by the vehicle so as to open the duct 10, so that external air is introduced therethrough, thereby preventing damage to the vehicle parts due to failure of the air flap 60.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An active air flap apparatus for a vehicle, comprising:
    a guide frame having a vertical column having a coupling hole, into which a flap loader is fitted, and a rod hole perforating the vertical column in such a manner as to be connected with the coupling hole; and
    an operating rod inserted into and slidable along the rod hole upward and downward, wherein the operating rod has a coupling groove into which the flap loader is selectively fitted.

2. The active air flap apparatus for a vehicle according to claim 1, wherein a maximum depth of the coupling groove is greater than a depth of the coupling hole.

3. The active air flap apparatus for a vehicle according to claim 1, wherein a shape of the portion of the vertical column where the coupling hole is formed is linear and of a constant thickness.

4. The active air flap apparatus for a vehicle according to claim 1, wherein the flap loader is configured such that when the flap loader is fitted into the coupling groove, the flap loader vertically moves together with the guide frame, and when the flap loader disengages from the coupling groove as the operating rod moves, the flap loader disengages from the coupling hole.

* * * * *